United States Patent
Lappos et al.

(10) Patent No.: US 12,286,217 B2
(45) Date of Patent: Apr. 29, 2025

(54) AUTOMATIC EMERGENCY LANDING GEAR EXTENSION SYSTEM

(71) Applicant: LOCKHEED MARTIN CORPORATION, Bethesda, MD (US)

(72) Inventors: Nicholas D. Lappos, Beryl, UT (US); Christopher A. Thornberg, Newtown, CT (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 247 days.

(21) Appl. No.: 17/824,213

(22) Filed: May 25, 2022

(65) Prior Publication Data

US 2023/0382519 A1   Nov. 30, 2023

(51) Int. Cl.
  *B64C 25/28* (2006.01)
  *B64D 45/00* (2006.01)
  *B64D 45/04* (2006.01)

(52) U.S. Cl.
  CPC .............. *B64C 25/28* (2013.01); *B64D 45/04* (2013.01); *B64D 2045/0085* (2013.01)

(58) Field of Classification Search
  None
  See application file for complete search history.

(56) References Cited

U.S. PATENT DOCUMENTS

| | | | |
|---|---|---|---|
| 3,224,713 A | 12/1965 | Pope | |
| 6,311,927 B1* | 11/2001 | Elving | B64C 25/22 |
| | | | 244/100 R |
| 8,714,480 B2 | 5/2014 | Prud'Homme-Lacroix et al. | |
| 9,517,837 B2 | 12/2016 | Lecourtier | |
| 10,426,393 B2 | 10/2019 | Bosworth et al. | |
| 10,759,523 B2 | 9/2020 | Schmidt | |
| 10,816,970 B2 | 10/2020 | Bosworth et al. | |
| 2015/0122945 A1 | 5/2015 | Kavounas | |
| 2017/0166323 A1 | 6/2017 | Dangler et al. | |
| 2019/0185148 A1 | 6/2019 | Flinton | |
| 2019/0332126 A1* | 10/2019 | Irwin, III | G05D 1/085 |
| 2020/0264635 A1* | 8/2020 | Wilson | G05D 1/654 |
| 2022/0266989 A1* | 8/2022 | Sure | B64C 25/26 |

FOREIGN PATENT DOCUMENTS

CN    114180036 A    3/2022

OTHER PUBLICATIONS

Extended European Search Report on European Patent Application No. 23163053.4 dated Sep. 25, 2023 (11 pages).

* cited by examiner

*Primary Examiner* — Todd Melton
*Assistant Examiner* — Jason R Roberson
(74) *Attorney, Agent, or Firm* — Foley & Lardner LLP

(57) ABSTRACT

Systems and methods for automatically controlling landing gear responsive to detected aerial vehicle conditions. A system can receive, from one or more sensors of the aerial vehicle, altitude information and speed information of the aerial vehicle. The system can determine to lower landing gear of the aerial vehicle based on a change in a state of the aerial vehicle, and identify a condition corresponding to a type of the aerial vehicle and the state of the aerial vehicle. The system can compare the speed information and the altitude information to the condition to determine that a condition to lower landing gear is satisfied. Responsive to determining that the condition to lower the landing gear is satisfied, the system can provide a signal to lower the landing gear.

20 Claims, 4 Drawing Sheets

AUTOMATIC EMERGENCY LANDING GEAR EXTENSION SYSTEM

TECHNICAL BACKGROUND

This disclosure relates to automatic lowering of landing gear in response to detected conditions.

BACKGROUND

Aerial vehicles, such as airplanes and other manually piloted or autonomous aircraft, can include retractable landing gear. During flight, a pilot of the aerial vehicle may retract the landing gear to improve aerodynamics. When landing the aerial vehicle, the pilot can lower or extend the landing gear to absorb the impact of landing the aerial vehicle.

SUMMARY

The systems and methods of this technical solution provide techniques for automatically controlling landing gear responsive to detected aerial vehicle conditions. A vehicle management system can monitor the state of the aerial vehicle, and identify conditions of the aerial vehicle, such as altitude and speed, which may correspond to a situation where the landing gear should be automatically lowered. If these conditions for the aerial vehicle are satisfied, the vehicle management system can automatically lower the landing gear without requiring pilot intervention or provide an alarm or signal to the pilot to cause or otherwise instruct the pilot to lower the landing gear, thereby reducing or preventing damage to the aerial vehicle or injury to any occupants upon landing.

The present technical solution can automatically detect aerial vehicle conditions, which may indicate that an emergency situation is occurring, and automatically initiate lowering of the landing gear such that the landing gear will be lowered in time for a potential collision. Often, such conditions result from aerial vehicle damage or other circumstances that are distracting or potentially disabling to a pilot of the aerial vehicle. Therefore, pilots may not be able to lower the landing gear in time without automatic intervention. The systems and methods described herein solve these and other issues.

At least one aspect of the present disclosure relates to a method for automatically controlling landing gear responsive to detected aerial vehicle conditions. The method may be performed, for example, by one or more processors coupled to memory of an aerial vehicle. The method can include receiving, from one or more sensors of the aerial vehicle, altitude information and speed information of an aerial vehicle. The method can include determining to extend landing gear of the aerial vehicle based on a change in a state of the aerial vehicle. The method can include identifying a condition corresponding to a type of aerial vehicle and the state of the aerial vehicle. The method can include comparing the speed information and the altitude information with the condition to determine that a condition to lower the landing gear is satisfied. The method can include, responsive to determining that the condition to lower the landing gear is satisfied, providing a signal to lower the landing gear.

In some implementations, the method includes instructing, responsive to the signal, a landing gear component of the aerial vehicle to lower the landing gear of the aerial vehicle. In some implementations, the method includes identifying an amount of time required to lower the landing gear of the aerial vehicle. In some implementations, the method includes determining the condition based on the amount of time. In some implementations, the method includes triggering release of a gas stored in a container to reduce an amount of time to lower the landing gear. In some implementations, the method includes providing, responsive to the signal, a notification for presentation via an output device that includes the signal to lower the landing gear.

In some implementations, the condition can be a multivariate condition including a plurality of variables. In some implementations, each of the plurality of variables can be associated with a respective weight value. In some implementations, comparing the speed information and the altitude information can include comparing, by the one or more processors, each of the speed information and the altitude information based on the respective weight value associated with a respective variable of the plurality of variables. In some implementations, the method includes adjusting the respective weight value associated with at least one variable of the plurality of variables based on the state of the aerial vehicle.

In some implementations, the change in the state can be one or more of an engine failure, a rapid descent, damage to the aerial vehicle, or a major system failure. In some implementations, detecting the change in the state of the aerial vehicle can be responsive to receiving an indication of the change in the state from one or more second sensors of the aerial vehicle. In some implementations, the method includes receiving an input from an interface of the aerial vehicle that indicates a command to lower the landing gear. In some implementations, the method includes providing the signal that indicates the landing gear should be lowered.

At least one other aspect of the present disclosure relates to a system configured for automatically controlling landing gear responsive to detected aerial vehicle conditions. The system can include one or more processors coupled to memory of an aerial vehicle. The system can receive, from one or more sensors of the aerial vehicle, altitude information and speed information of an aerial vehicle. The system can determine to extend landing gear of the aerial vehicle based on a change in a state of the aerial vehicle. The system can identify a condition corresponding to a type of the aerial vehicle and the state of the aerial vehicle. The system can compare the speed information and the altitude information with the condition to determine that a condition to lower the landing gear is satisfied. The system can, responsive to determining that the condition to lower the landing gear is satisfied, provide a signal to lower the landing gear.

In some implementations, the system can instruct, responsive to the signal, a landing gear component of the aerial vehicle to lower the landing gear of the aerial vehicle. In some implementations, the system can identify, by the one or more processors, an amount of time required to lower the landing gear of the aerial vehicle. In some implementations, the system can determine, by the one or more processors, the condition based on the amount of time. In some implementations, the system can trigger release of a gas stored in a container to reduce an amount of time to lower the landing gear.

In some implementations, the system can provide, responsive to the signal, a notification for presentation via an output device of the aerial vehicle that includes the signal to lower the landing gear. In some implementations, the condition can be a multivariate condition including a plurality of variables. In some implementations, each of the plurality of variables can be associated with a respective weight value.

In some implementations, comparing the speed information and the altitude information can include comparing, by the one or more processors, each of the speed information and the altitude information based on the respective weight value associated with a respective variable of the plurality of variables. In some implementations, the system can adjust the respective weight value associated with at least one variable of the plurality of variables based on the state of the aerial vehicle.

In some implementations, the change in the state can be one or more of an engine failure, a rapid descent, damage to the aerial vehicle, or a major system failure. In some implementations, detecting the change in the state of the aerial vehicle can be responsive to receiving an indication of the change in the state from one or more second sensors of the aerial vehicle. In some implementations, the system can receive an input from an interface of the aerial vehicle that indicates a command to lower the landing gear. In some implementations, the system can provide the signal that indicates the landing gear should be lowered.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks or other non-transitory storage media) or intangible carrier media (e.g. communication signals). Aspects may also be implemented using suitable apparatus, which may take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
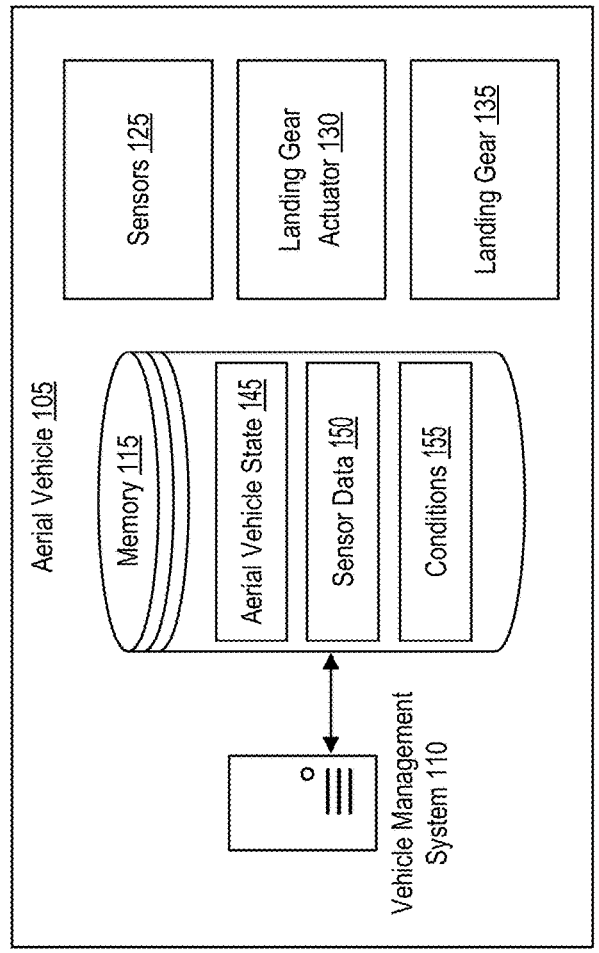
FIG. 1 is a illustrates a block diagram of a system for automatically controlling landing gear responsive to detected aerial vehicle conditions, in accordance with one or more implementations.

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations may be utilized, and other changes may be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

For purposes of reading the description of the various embodiments below, the following descriptions of the sections of the specification and their respective contents may be helpful:

Section A describes systems, apparatuses, and methods for automatically controlling landing gear responsive to detected aerial vehicle conditions; and Section B describes a computer system to be used in implementing various components described herein.

A. Automatically Controlling Landing Gear Responsive to Detected Aerial Vehicle Conditions The systems, apparatuses, and methods of the technical solution described herein allow landing gear of an aerial vehicle to be automatically lowered responsive to detected aerial vehicle conditions, rather than waiting for pilot input. Without this technical solution, pilots may manually initiate lowering of aerial vehicle landing gear. However, in critical situations, such as circumstances where a crash landing or an emergency landing are imminent, pilots may be distracted, disabled, or are otherwise unable to timely lower the landing gear. At the same time, such critical conditions are the most important for the lowering of landing gear, because extending the landing gear in time allows the landing gear to absorb the potential impact.

The systems and methods described herein can be used to detect aerial vehicle conditions that indicate that an emergency situation is occurring (or will occur), and automatically initiate lowering of the landing gear. The systems and methods can monitor sensor data of the aerial vehicle, and compare that sensor data to one or more conditions that are determined for the aerial vehicle. The conditions may be a multivariate condition space. The sensor information can be compared to the conditions identified for the aerial vehicle to determine whether the landing gear should be automatically lowered. In some cases, the techniques described herein may implement additional emergency measures to lower landing gear faster, for example, in emergency situations. If it is determined that the aerial vehicle will impact terrain before the landing gear can be lowered under normal conditions, a one-time emergency gas bottle can be activated to rapidly deploy the landing gear.

Referring now to FIG. 1, illustrated is a block diagram of an example system 100 for automatically controlling landing gear responsive to detected aerial vehicle conditions, in accordance with one or more implementations. In brief overview, the system 100 can include at least one aerial vehicle 105. The aerial vehicle 105 can include at least one vehicle management system 110, at least one memory 115, one or more sensors 125, at least one landing gear actuator 130, and landing gear 135. The memory 115 can store sensor data 150, an aerial vehicle state 145, and one or more conditions 155. The vehicle management system 110, the memory 115, the sensors 125 and the landing gear actuator 130 may be connected or communicatively coupled with one another. The vehicle management system 110, the memory 115, the sensors 125, the landing gear actuator 130 may be implemented at least in part using one or more of the components of the computer system 400 described in connection with Section B.

The aerial vehicle 105 can be any type of aerial vehicle, such as a helicopter, an airplane, an unmanned aerial vehicle (UAV), a drone, a vertical take-off and landing (VTOL) aircraft, or any other type of aerial vehicle. The aerial vehicle 105 can be operated by one or more pilots, for example, using aerial vehicle control devices. The aerial vehicle 105 can be dispatched to address one or more remote issues by completing one or more assigned tasks, which may be performed in close proximity to environmental obstacles. Such assigned tasks can include, for example, combat tasks or taking off or landing in precarious environments, such as oil rigs. The aerial vehicle 105 may be equipped with any type of device or system that may be used to complete a task or mission that has been assigned to the aerial vehicle 105. The aerial vehicle 105 may include one or more communications interfaces (not pictured), via which the aerial vehicle 105 or the vehicle management system 110 may transmit information, including any of the information used in the techniques described herein.

The sensors 125 can be mounted on the interior or the exterior of the aerial vehicle 105. Non-limiting examples of the sensors 125 include LiDAR sensors, visible light sensors (e.g., cameras, video capture devices, etc.), infrared light sensors, accelerometers, gyroscopes, magnetometers, elevation sensors, pressure sensors, temperature sensors, force sensors, proximity sensors, radar sensors, angle-of-attack sensors, global positioning system (GPS) sensors, thermal infrared cameras, and thermal imaging cameras, among others. Sensor information can be retrieved from the sensors 125 by the vehicle management system 110. In some implementations, one or more of the sensors 125 can provide sensor data periodically (e.g., in a batch transmission, etc.) to the vehicle management system 110. In some implementations, one or more of the sensors 125 can provide sensor data to the vehicle management system 110 upon receiving a corresponding request for sensor data from the vehicle management system 110.

The landing gear actuator 130 can be any type of landing gear actuation mechanism that is capable of raising or lowering the landing gear 135 of the aerial vehicle 105. The landing gear actuator 130 can be, for example, a hydraulic actuation mechanism that utilizes pumps and hydraulic fluid to force the landing gear 135 into and out of the aerial vehicle 105. The landing gear actuator 130 can be in communication with the vehicle management system 110, which can send signals to the landing gear actuator 130 to raise or lower the landing gear 135. In some implementations, the landing gear actuator 130 can include one or more servo motors or other electromechanical components that can aid in the movement of the landing gear 135 into and out of the aerial vehicle 105. The landing gear actuator 130 may be positioned in and coupled to the landing gear 135. In some implementations, the landing gear actuator 130 can include an emergency gas bottle or other container that stores a gas. The gas can be stored under pressure in the container. The container can be triggered or activated in response to a signal from the vehicle management system 110 to release the gas stored in the container. Upon release of the gas, the gas from the container can overload the hydraulic system and lower the landing gear 135 at an accelerated pace, thereby reducing the amount of time taken to lower the landing gear absent usage of the gas in the bottle. Alternative or additional emergency landing measures may include additional springs or hydraulic systems that rapidly lower the landing gear 135. Such emergency measures are useful, for example, when a crash or emergency landing is imminent and the landing gear actuator 130 would otherwise be unable to lower the landing gear 135 before impact.

The landing gear 135 can be disposed on the undercarriage of the aerial vehicle 105, and can be used for either take-off or landing. The landing gear 135 can support the aerial vehicle 105 when the aerial vehicle 105 is in contact with the ground, and can include wheels (e.g., tricycle undercarriage wheels or quadricycle wheels) and other supporting features to support the vehicle 105 when it is not flying. The landing gear 135 can be retractable landing gear 135 that is stowed away in the body of the aerial vehicle 105 while the aerial vehicle 105 is in flight. The landing gear 135 can be coupled to the landing gear actuator 130, which can control when the landing gear 135 is lowered or retracted into the body of the aerial vehicle 105. Under normal operating conditions, the landing gear 135 may take a predetermined amount of time to be lowered or retracted by the landing gear actuator 130.

The aerial vehicle 105 may include additional controls, such as display devices. The display devices can include any type of device capable of presenting information to a pilot (not pictured) that operates the aerial vehicle 105. The display devices can be positioned within the aerial vehicle 105 such that they can be viewed while the pilot is operating the aerial vehicle 105. The display devices can include devices that present specific sensor information, such as speed, direction, velocity, or location. The display devices can also be general display devices that can present information used in the techniques described herein, such as alerts or indications that the landing gear 135 has been automatically lowered, or that the landing gear should be lowered to avoid damage from a potential impact. The display devices can include an electronic flight instrument system (EFIS), which can include one or more primary flight displays, one or more multi-function displays, or other displays. Types of display devices can include liquid crystal displays (LCDs), light-emitting diode (LED) displays, organic light-emitting diode (OLED) displays, bi-stable displays (e.g., e-ink, etc.), among others. As described herein, the vehicle management system 110 may present alerts or other information related to the aerial vehicle state 145, the sensor data 150, or the conditions 155, or an indication that the landing gear 135 is automatically being lowered.

The memory 115 can be a computer-readable memory that can store or maintain any of the information described herein. The memory 115 can maintain one or more data structures, which may contain, index, or otherwise store each of the values, pluralities, sets, variables, vectors, numbers, or thresholds described herein. The memory 115 can be accessed using one or more memory addresses, index values, or identifiers of any item, structure, or region maintained in the memory 115. The memory 115 can be accessed by the vehicle management system 110. In some implementations, other computing devices present on the aerial vehicle 105 can access the memory 115. The vehicle management system 110 can store the results of any or all computations in one or more data structures in the memory 115, such that the data structures are indexed or identified with appropriate values for later access.

The memory 115 can store, in one or more data structures, an aerial vehicle state 145. The aerial vehicle state 145 can indicate a state of the aerial vehicle 105, which may be derived or determined at least in part based on the sensor data 150. The aerial vehicle state 145 can include multivariate values relating to conditions under which the landing gear 135 should be automatically lowered, including the aerial vehicle 105 velocity, the aerial vehicle 105 altitude, or a rate of change in velocity or altitude. In some implementations, the aerial vehicle state 145 can include indications of whether the aerial vehicle 105 has experience some type of damage, such as damage to the body of the aerial vehicle 105 that has been experienced during a combat scenario. The aerial vehicle state 145 can include information about a status (e.g., operational or experiencing failure, etc.) of one or more components of the aerial vehicle 105, such as the engines of the aerial vehicle 105 or other systems used to operate the aerial vehicle 105.

The memory 115 can store sensor data 150, for example, in one or more data structures. The sensor data 150 may be stored by the vehicle management system 110 upon receiving the sensor data from the sensors 125. The sensor data 150 can include, for example, velocity information, acceleration information, altitude information, or derivatives of such information. For example, the sensor data 150 may include a rate of change in the altitude of the aerial vehicle 105 or a rate of change in acceleration of the aerial vehicle 105. The sensor data 150 can be stored, for example, in one or more data structures in association with one or more timestamps corresponding to when the sensor data 150 was captured by the sensors 125. The sensor data 150 can include orientation data of the aerial vehicle 105, for example, relative to the terrain surrounding the aerial vehicle 105.

Figure 2:
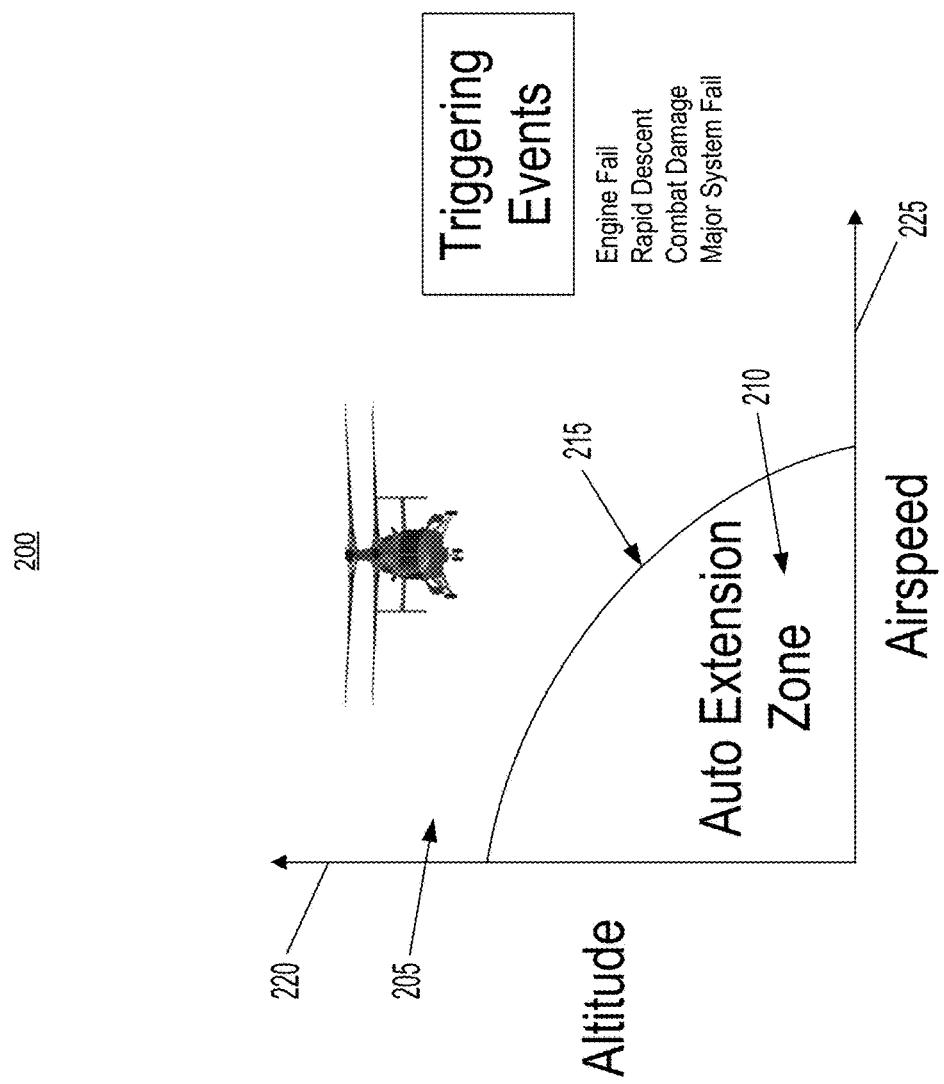
FIG. 2 illustrates an example plot of conditions that indicate landing gear should be automatically lowered, in accordance with one or more implementations.

The memory 115 can store one or more conditions 155, for example, in one or more data structures. The conditions 155 can be any type of condition to which the sensor data 150 can be compared to determine that the landing gear 135 should be lowered. The conditions 155 may be a multivariate conditional space, defining one or more boundaries that indicate whether the landing gear 135 should be automatically lowered. An example representation of a multivariate conditional space is depicted in FIG. 2. Referring briefly to FIG. 2, illustrated is an example graph 200 that shows a region corresponding to airspeed and altitude at which the landing gear 135 for an example aerial vehicle 105 should be lowered.

Referring back to FIG. 1, the conditions 155 can include altitude conditions (e.g., a predetermined altitude value below which the landing gear 135 should be lowered, a predetermined rate of change in altitude indicating that the landing gear 135 should be lowered, etc.), speed conditions (e.g., a predetermined speed value below which the landing gear 135 should be lowered, a predetermined rate of change in speed indicating that the landing gear 135 should be lowered, etc.), or other types of conditions relevant to automatic lowering of landing gear 135. Generally, the conditions 155 can be multivariate thresholds that define multidimensional boundaries that indicate whether the landing gear 135 should be lowered. The boundaries may be predetermined, or may be calculated in part by modifying weight values associated with each variable (e.g., altitude thresholds, speed thresholds, etc.) according to the aerial vehicle state 145. In some implementations, sets of conditions 155 can be stored in the memory 115 and indexed by the type of characteristics of the aerial vehicle 105 or one or more aerial vehicle states 145, among others. These sets of conditions 155 can be used to account for differences in types of aerial vehicles 105 that operate under different altitudes and speeds. In some implementations, the sets of conditions 155 can be indexed by the type of the landing gear 135, which may indicate an amount of time taken to fully lower the landing gear 135.

The vehicle management system 110 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The vehicle management system 110 can communicate with any of the components of the aerial vehicle 105, including the memory 115, the sensors 125, any display devices, the landing gear actuator 130, and one or more communication interfaces (not pictured), to perform the operations described herein. The vehicle management system 110 can include any or all of the components and perform any or all of the functions of the computer system 400 described in connection with FIG. 4.

Referring now to the operations of the vehicle management system 110, the vehicle management system 110 can receive, from one or more sensors 125 of the aerial vehicle, altitude information and speed information of the aerial vehicle 105. The vehicle management system 110 can store the information captured by the sensors 125 as part of the sensor data 150. Using the sensor data 150, such as data captured from proximity sensors, cameras, or LiDAR sensors (e.g., the sensors 125), gyroscopes, accelerometers, or altimeters, among others the vehicle management system 110 can determine a speed and an altitude of the aerial vehicle 105. The vehicle management system 110 can monitor the speed and the altitude of the aerial vehicle 105 on a periodic basis, or when new sensor data has been captured by the one or more sensors 125. The vehicle management system 110 can store the information captured by the sensors 125 in association with one or more timestamps indicating when the sensor data 150 was captured. The timing information can be utilized by the vehicle management system 110 to calculate a change in speed or a change in altitude over time (e.g., derivative values).

The vehicle management system 110 can determine to extend the landing gear of the aerial vehicle based on a change in a state of the aerial vehicle. In addition to storing captured sensor data 150, the vehicle management system 110 can monitor a state of the aerial vehicle 105. For example, the state aerial vehicle state 145 can be any type of state that can indicate the aerial vehicle 105 should land. Such examples of the state 145 can include whether the aerial vehicle 105 is rapidly slowing down or descending, whether the systems of the aerial vehicle 105 are operating correctly (e.g., whether aerial vehicle 105 systems are operational or if a failure has been detected), or whether the aerial vehicle 105 has experienced combat damage or another type of damage or breach, or any other aerial vehicle condition that indicates the aerial vehicle 105 should land.

The information relating to the change in the aerial vehicle state 145 can be detected, for example, from one or more sensors 125 positioned on or in the aerial vehicle 105. For example, if an air pressure sensor 125 indicates that the aerial vehicle 105 has depressurized, the vehicle management system 110 can determine that the aerial vehicle 105 may have experienced some type of damage. The vehicle management system 110 can monitor the status of one or more systems of the aerial vehicle 105 (e.g., through a polling arrangement, or via receiving signals from the systems that indicate an operational metric such as functional or failed, etc.) to detect a change in the status of the aerial vehicle systems 105. In some implementations, if the aerial vehicle 105 does not receive a signal from a signal from an aerial vehicle 105 system indicating that the respective system is operating correctly for a predetermined amount of time, the aerial vehicle 105 can set a flag in the aerial vehicle state 145 indicating that the system has failed. Similar operations can be performed to detect other changes to the aerial vehicle state 145 described herein.

The vehicle management system 110 can identify a condition 155 corresponding to a type of the aerial vehicle and the aerial vehicle state 145. As described herein above, the conditions 155 can be stored in association with corresponding identifiers of conditions, aerial vehicle types, or aerial vehicle characteristics. This allows for several conditions 155 to be potentially utilized when making a determination to automatically lower the landing gear 135. The condition 155 identified by the vehicle management system 110 can correspond to the aerial vehicle state 145. To identify the conditions 155, the vehicle management system 110 can access the one or more data structures in the memory 115 storing the conditions 155, which are indexed by the aerial vehicle 105 type and the detected aerial vehicle state 145 that indicates the aerial vehicle 105 should land. For example, if the condition indicates that the altitude of the aerial vehicle 105 is decreasing rapidly, the conditions 155 (e.g., speed or altitude thresholds that indicate the landing gear should be automatically lowered) to extend the landing gear 135 may be different than the conditions 155 associated with an engine failure event. The vehicle management system 110 can first identify the conditions 155 (which may be multivariate sets of conditions) that correspond to the type of landing gear actuator 130 or the type or characteristics of the aerial vehicle 105. Then, from those identified conditions 155, the vehicle management system 110 can identify a set of conditions 155 (e.g., a multivariate set of conditions such as those described in connection with FIG. 2) that correspond to the detected aerial vehicle state 145 that indicates the aerial vehicle 105 should land.

In some implementations, the vehicle management system 110 can identify an amount of time to lower the landing gear 135 of the aerial vehicle 105. This information may be stored as part of one or more aerial vehicle characteristics in the memory 115. The vehicle management system 110 can retrieve this information from the memory 115 of the aerial vehicle 105, to determine an amount of time that the landing gear actuator 130 takes to fully deploy the landing gear 135. The vehicle management system 110 can, in some implementations, identify the condition 155 based on the amount of time that it takes to deploy the landing gear 135. For example, the conditions 155 may be indexed in the memory 115 based on the amount of time it takes for the landing gear actuator 130 to fully lower the landing gear of the aerial vehicle 105, which may itself be a function of the speed or other characteristics of the aerial vehicle 105.

The identified condition 155 can be a multivariate condition, which can include two or more variables that are each associated with a respective weight value. The weight value can be a scalar value that may be modified based on one or more aspects of the aerial vehicle state 145, and can modify a threshold (and therefore the multivariate boundary of the condition 155) corresponding to the variable. An example of such a variable can be the speed or altitude of the aerial vehicle 105. In some implementations, the vehicle management system 110 can identify the condition 155 by modifying one or more of the weight values of a multivariate set of conditions 155 (e.g., identified based on the type of aerial vehicle 105 or the amount of time taken to lower the landing gear 135 of the aerial vehicle 105, etc.) based on the aerial vehicle state 145. For example, if the aerial vehicle state 145 indicates that the aerial vehicle 105 is rapidly descending without pilot input, the vehicle management system 110 can identify that the altitude of the aerial vehicle 105 is an important factor in determining whether to automatically deploy the landing gear 135, and can increase (e.g., increase) the weight value associated with the altitude variable in the conditions 155. Other variables may also be decreased or not considered at all if irrelevant to a particular aerial vehicle state 145. Similar operations can be performed to adjust the weight values associated other variables for other aerial vehicle states 145, such as speed, change in speed over time, or change in altitude over time.

The vehicle management system 110 can compare the speed information and the altitude information with the condition(s) 155 to determine that a condition to lower the landing gear 135 of the aerial vehicle 105 is satisfied. As described herein above, the conditions can be multivariate conditions 155, which may include multiple variables that each define a respective threshold in a multivariate coordinate space. Regions of the multivariate coordinate space can correspond to the condition of whether to lower the landing gear 135. In some implementations, the vehicle management system 110 can first multiply each of the variables (e.g., thresholds in a multivariate space, such as that described in connection with FIG. 2) by any (potentially adjusted) weight values associated each respective variable. This can alter the "shape" of the multivariate regions that indicate whether the landing gear 135 should be lowered.

The vehicle management system 110 can compare one or more of the conditions 155 (e.g., the multivariate threshold values) to corresponding values gathered from the sensor data 150. For example, the vehicle management system 110 can compare the speed information of the aerial vehicle 105 and the altitude information to a speed threshold and an altitude threshold, respectively, stored in the identified conditions 155. If the vehicle management system 110 determines that the compared information satisfies (e.g., less than or equal to, etc.) each of the thresholds in the identified condition 155, the vehicle management system 110 can determine that the condition 155 to lower the landing gear 135 is satisfied. Otherwise, if the identified condition 155 is not satisfied, the vehicle management system 110 can determine that the landing gear 135 should not be automatically lowered, and the aerial vehicle 105 can continue to operate under normal conditions. The vehicle management system 110 can determine that an emergency condition 155 is satisfied if the landing gear actuator 130 is unable to lower the landing gear 135 before a predicted impact (e.g., based on an average change in altitude or speed over time, etc.).

Once the vehicle management system 110 determines that the condition to lower the landing gear 135 is satisfied, the vehicle management system 110 can provide a signal to the landing gear actuator 130 to lower the landing gear 135. The signal can be an initiation signal that causes one or more hydraulic pumps or electromechanical actuators of the landing gear actuator 130 to begin deploying the landing gear 135. The vehicle management system 110 can transmit the signal via one or more communications interfaces, which may be directly coupled to the landing gear actuator 130. In some implementations, the signal to the landing gear actuator 130 can be manually provided, for example, in response to receiving a command via one or more user input devices operated by a pilot of the aerial vehicle 105. The signal can be, for example, a simple electric signal, or in some implementations, the signal can be an instruction to the landing gear actuator 130 of the aerial vehicle 105 to lower the landing gear 135.

In some implementations, if an emergency condition 155 is detected that indicates that the landing gear actuator 130 is unable to lower the landing gear before a predicted impact, the vehicle management system 110 can trigger release of a gas stored in a container to lower the landing gear 135. The container of gas can be a one-time use device that rapidly deploys the landing gear 135 of the aerial vehicle 105. Providing the signal to the gas bottle can rapidly deploy the landing gear 135, thereby reducing the amount of time to lower the landing gear 135 and potentially preventing or reducing damage to the aerial vehicle 105 upon impact. In some cases, the vehicle management system 110 can provide the signal including a notification for presentation via an output device (e.g., a display device, an audio alarm, a haptic feedback device, etc.) of the aerial vehicle 105. The vehicle management system 110 can provide one or more notifications in a graphical user interface on a display device of the aerial vehicle 105, which can include or otherwise indicate the signal to lower the landing gear 135.

Referring to FIG. 2, and others, illustrated is an example graph 200 that shows a region corresponding to airspeed and altitude at which the landing gear 135 for an example aerial vehicle 105 should be lowered. In this example graph, at least two variables are utilized to determine whether to automatically lower the landing gear of the aerial vehicle: the speed of the aerial vehicle and the altitude of the aerial vehicle. Each of the variables correspond to a respective axis, with the aerial vehicle altitude represented by the axis 220 and the aerial vehicle speed represented by the axis 225. As shown, this creates a two-dimensional space within which regions can be defined by one or more curves. The curve 215 defines two regions in the graph 200, the region 205 above the curve 215, which indicates that the landing gear should not be lowered, and the region 210 below the curve, which indicates the landing gear should be automatically lowered. The curve 215 in the multivariate space may be defined on a per-aircraft basis, or on a per-configuration basis (e.g., type of landing gear, weight, cargo, flight characteristics, etc.) for particular aircraft. For example, certain aircraft may require more time to lower the landing gear, which can affect the altitude constraints that define the curve 215. Generally, the curve 215 is defined by a set of constraints for each variable. Although shown here as a two-dimensional curve, it should be understood that additional variables may also be considered in a multivariate space, to define regions similar to the regions 205 and 210 in a multidimensional space.

Figure 3:
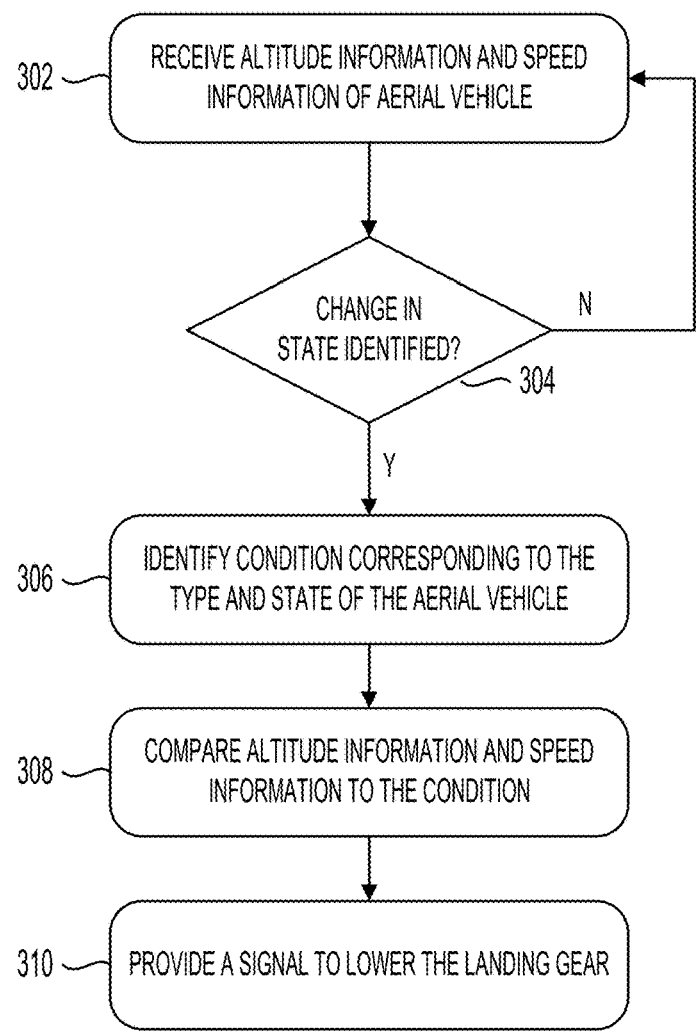
FIG. 3 illustrates a flow diagram of a method for automatically controlling landing gear responsive to detected aerial vehicle conditions, in accordance with one or more implementations.

Referring now to FIG. 3, depicted is an illustrative flow diagram of a method 300 for automatically controlling landing gear responsive to detected aerial vehicle conditions. The method 300 can be executed, performed, or otherwise carried out by the vehicle management system 110, the computer system 400 described herein in conjunction with FIG. 4, or any other computing devices described herein. In brief overview, the method 300 can include receiving altitude information and speed information of an aerial vehicle (STEP 302), determining to extend the landing gear of the aerial vehicle based on a change in an aerial vehicle state (STEP 304), identifying a condition corresponding to the type and state of the aerial vehicle (STEP 306), comparing the altitude information and the speed information to the condition (STEP 308), and providing a signal to lower the landing gear of the aerial vehicle (STEP 310).

In further detail, the method 300 can include receiving altitude information and speed information of an aerial vehicle (e.g., the aerial vehicle 105) (STEP 302). A vehicle management system (e.g., the vehicle management system 110) can receive, from one or more sensors (e.g., the sensors 125) of the aerial vehicle, altitude information and speed information of the aerial vehicle. The vehicle management system can store the information captured by the sensors 125 as part of sensor data (e.g., the sensor data 150) in the memory of the aerial vehicle (e.g., the memory 115). Using the sensor data, such as data captured from proximity sensors, cameras, or LiDAR sensors (e.g., the sensors 125), gyroscopes, accelerometers, or altimeters, among others the vehicle management system 110 can determine a speed and an altitude of the aerial vehicle. The vehicle management system can monitor the speed and the altitude of the aerial vehicle on a periodic basis, or when new sensor data has been captured by the one or more sensors. The vehicle management system can store the information captured by the sensors in association with one or more timestamps indicating when the sensor data 150 was captured. The timing information can be utilized by the vehicle management system to calculate a change in speed or a change in altitude over time (e.g., derivative values).

The method 300 can include determining to extend the landing gear of the aerial vehicle based on a change in an aerial vehicle state (STEP 304). The vehicle management system can determine extend the landing gear of the aerial vehicle based on a change in a state of the aerial vehicle (e.g., the aerial vehicle state 145). In addition to storing captured sensor data 150, the vehicle management system can monitor a state of the aerial vehicle. For example, the state of the aerial vehicle can be any type of state that can indicate the aerial vehicle should land. Such examples of the state can include whether the aerial vehicle is rapidly slowing down or descending, whether the systems of the aerial vehicle are operating correctly (e.g., whether aerial vehicle systems are operational or if a failure has been detected), or whether the aerial vehicle has experienced combat damage or another type of damage or breach, or any other aerial vehicle condition that indicates the aerial vehicle should land.

The information relating to the change in the aerial vehicle state can be detected, for example, from one or more sensors positioned on or in the aerial vehicle. For example, if an air pressure sensor indicates that the aerial vehicle has depressurized, the vehicle management system can determine that the aerial vehicle may have experienced some type of damage. Similarly, the vehicle management system can monitor the status of one or more systems of the aerial vehicle (e.g., through a polling arrangement, or via receiving signals from the systems that indicate an operational metric such as functional or failed, etc.) to detect a change in the status of the aerial vehicle systems. In some implementations, if the aerial vehicle does not receive a signal from an aerial vehicle system indicating that the respective system is operating correctly for a predetermined amount of time, the aerial vehicle can set a flag in the aerial vehicle state indicating that the system has failed. Similar operations can be performed to detect other changes to the aerial vehicle state described herein. If the vehicle management system determines to extend the landing gear of the aerial vehicle, the vehicle management system can proceed to execute STEP 306 of the method 300. Otherwise, the vehicle management system can continue to receive sensor data from the sensors at STEP 302 of the method 300.

The method 300 can include identifying a condition (e.g., one or more conditions 155) corresponding to the type and state of the aerial vehicle (STEP 306). The conditions can be stored in association with corresponding identifiers of conditions, aerial vehicle types, or aerial vehicle characteristics. This allows for several conditions to be potentially utilized when making a determination to automatically lower the landing gear. The condition identified by the vehicle management system can correspond to the aerial vehicle state. To identify the conditions, the vehicle management system can access the one or more data structures in the memory storing the conditions, which are indexed by the aerial vehicle type and the detected aerial vehicle state that indicates the aerial vehicle should land. For example, if the condition indicates that the altitude of the aerial vehicle is decreasing rapidly, the conditions (e.g., speed or altitude thresholds that indicate the landing gear should be automatically lowered) to extend the landing gear may be different than the conditions associated with an engine failure event. The vehicle management system can first identify the conditions (which may be multivariate sets of conditions) that correspond to the type of a landing gear actuator (e.g., the landing gear actuator 130) or the type or characteristics of the aerial vehicle. Then, from those identified conditions, the vehicle management system can identify a set of conditions (e.g., a multivariate set of conditions such as those described in connection with FIG. 2) that correspond to the detected aerial vehicle state that indicates the aerial vehicle should land.

In some implementations, the vehicle management system can identify an amount of time to lower the landing gear of the aerial vehicle. This information may be stored as part of one or more aerial vehicle characteristics in the memory. The vehicle management system can retrieve this information from the memory of the aerial vehicle, to determine an amount of time that the landing gear actuator takes to fully deploy the landing gear. The vehicle management system can, in some implementations, identify the condition based on the amount of time that it takes to deploy the landing gear. For example, the conditions may be indexed in the memory based on the amount of time it takes for the landing gear actuator to fully lower the landing gear of the aerial vehicle, which may itself be a function of the speed or other characteristics of the aerial vehicle.

As described herein above, the identified condition can be a multivariate condition, which can include two or more variables that are each associated with a respective weight value. The weight value can be a scalar value that may be modified based on one or more aspects of the aerial vehicle state, and can modify a threshold (and therefore the multivariate boundary of the condition) corresponding to the variable. An example of such a variable can be the speed or altitude of the aerial vehicle. In some implementations, the vehicle management system can identify the condition by modifying one or more of the weight values of a multivariate set of conditions (e.g., identified based on the type of aerial vehicle or the amount of time to lower the landing gear of the aerial vehicle, etc.) based on the aerial vehicle state. For example, if the state of the aerial vehicle indicates that the aerial vehicle is rapidly descending without pilot input, the vehicle management system can identify that the altitude of the aerial vehicle is an important factor in determining whether to automatically deploy the landing gear, and can increase (e.g., increase) the weight value associated with the altitude variable in the conditions. Other, less important variables may also be decreased or not considered at all if irrelevant to a particular aerial vehicle state. Similar operations can be performed to adjust the weight values associated other variables for other aerial vehicle states, such as speed, change in speed over time, or change in altitude over time.

The method 300 can include comparing the altitude information and the speed information to the condition (STEP 308). The vehicle management system can compare the speed information and the altitude information with the condition(s) to determine that a condition to lower the landing gear of the aerial vehicle is satisfied. As described herein above, the conditions can be multivariate conditions, which may include multiple variables that each defines a respective threshold in a multivariate coordinate space. Regions of the multivariate coordinate space can correspond to the condition of whether to lower the landing gear. In some implementations, the vehicle management system can first multiply each of the variables (e.g., thresholds in a multivariate space, such as that described in connection with FIG. 2) by any (potentially adjusted) weight values associated each respective variable. This can alter the "shape" of the multivariate regions that indicate whether the landing gear should be lowered.

Different conditions may be determined for particular aircraft, landing gear, or aircraft configurations. The conditions may be determined based on modeling of aircraft behavior under a variety of altitude or speed conditions, and may be set to minimize damage to the aircraft and crew upon impact. Various conditions may be determined and utilized to account for both normal and rapid extension (e.g., emergency extension) of landing gear. For example, a first set of thresholds of one or may indicate that the landing gear should be lowered using normal operation of the landing gear actuator. However, another set of thresholds, if satisfied, may indicate that the landing gear should be extended using a rapid extension feature of the landing gear actuator (e.g., a gas-bottle system, additional hydraulics, etc.).

The criteria for these conditions can be specific to an aerial vehicle, and may be determined based on the aerial vehicle and rotor system design. Determining the thresholds or conditions can be performed through data analysis and simulations that project the time to ground impact for a variety of failure and operational conditions of the aerial vehicle. The types of conditions utilized may also be based on the types of sensors available or in operation at on the aerial vehicle, which are used detect the condition and project time to impact. For example, a rate of descent based on altitude information captured by a radar or an altitude sensor, which may be used to estimate a time to impact. Based on the time to impact, the vehicle management system can determine whether to trigger automatic extension of the landing gear, or whether to engage a rapid emergency landing gear extension. As such, a first set of conditions can trigger normal extension of the landing gear, and subsequently a second set of conditions, if met, can then initiate a rapid extension of the landing gear if the projected impact time is reducing more quickly than originally detected.

The vehicle management system can compare each of the conditions (e.g., the multivariate threshold values) to corresponding values gathered from the sensor data 150. For example, the vehicle management system can compare the speed information of the aerial vehicle and the altitude information to a speed threshold and an altitude threshold, respectively, stored in the identified conditions. If the vehicle management system determines that the compared information satisfies (e.g., less than or equal to, etc.) each of the thresholds in the identified condition, the vehicle management system can determine that the condition to lower the landing gear is satisfied. Otherwise, if the identified condition is not satisfied, the vehicle management system can determine that the landing gear should not be automatically lowered, and the aerial vehicle can continue to operate under normal conditions. In some implementations, the vehicle management system can determine that an emergency condition is satisfied if the landing gear actuator 130 is unable to lower the landing gear before a predicted impact (e.g., based on an average change in altitude or speed over time, etc.).

The vehicle management system can utilize a variety of detection and processing techniques to determine when to trigger automatic extension of the landing gear. In some implementations, in addition to the emergency-related conditions described herein, the vehicle management system can trigger automatic extension of the landing gear even when a non-emergency condition is detected, for example, when the aerial vehicle is operating at a low altitude and low speed as a proactive precaution against a potential engine failure where there is not sufficient time to extend the landing gear. Various conditions, on their own or in any combination, can be utilized to determine whether to trigger the landing gear. Such sensors may include sensors that determine a height of the aerial vehicle above the terrain, sensors that estimate a rate of descent of the aerial vehicle (e.g., barometric sensors, GPS sensors, inertial sensors, etc.), or GPS altitude sensors, which may be used to estimate or project a descent trajectory. The trajectory may be an estimated flight path for the aerial vehicle, which may be used to estimate a projected impact time. Sensors such as forward-looking radar sensors, LiDAR sensors, or a terrain mapping technique can be used to accurately determine how the estimated flight path of the aerial vehicle will interact with the terrain profile. For example, the terrain profile may indicate variations in elevation, such as mountains, hills, or valleys, which can intersect with the flight path to indicate a potential impact at an estimated time. The vehicle management system can utilize the estimate impact time to trigger the landing gear, or an emergency rapid extension process as described herein, to reduce damage resulting from the projected impact.

Sensors or components of the aerial vehicle can be used to detect on-board aerial vehicle failures, such engine failure, fuselage damage, or other aerial vehicle conditions. For example, the vehicle management system can communicate with the components of the aerial vehicle to detect component failure, such as an engine failure, as well as the current altitude and speed of the aerial vehicle. The vehicle management system can determine, based on the high altitude and speed, whether there is an adequate amount of time for the landing gear to extend, and can initiate a normal automatic extension of the landing gear. However, if the expected aircraft response to the engine failure or other component failure indicates that the estimated time to impact falls below a threshold, the landing gear can be automatically extended using an additional emergency extension process. The time to impact can be continuously monitored, for example, on a periodic basis or as sensor data is captured by the sensors of the aerial vehicle, or as signals are received from the components of the aerial vehicle. If the time of impact is falls below the expected normal landing gear extension time, the rapid landing gear extension can be triggered.

The vehicle management system can proactively provide a signal to extend the landing gear under certain low altitude, low speed conditions as a protection against possible failures when the landing gear would otherwise not have time to extend. For example, the vehicle management system can proactively extend the landing gear to protect against engine failures while the aerial vehicle is maintaining a low-altitude hover. The vehicle management system can proactively extend the landing gear based on an estimate of the amount of time it would take for the aerial vehicle to impact the ground following an engine or component failure at a low altitude. The altitude or speed criteria can be established by simulation and analysis of flight conditions, or using an actual flight test for the specific aircraft design and configuration. The landing gear extension condition can include an additional margin to increase the minimum landing gear extension altitude, to improve overall safety.

The method 300 can include providing a signal to lower the landing gear of the aerial vehicle (STEP 310). Once the vehicle management system determines that the condition to lower the landing gear is satisfied, the vehicle management system can provide a signal to the landing gear actuator to lower the landing gear. The signal can be an initiation signal that causes one or more hydraulic pumps or electromechanical actuators of the landing gear actuator to begin deploying the landing gear. The vehicle management system can transmit the signal via one or more communications interfaces, which may be directly coupled to the landing gear actuator. In some implementations, the signal to the landing gear actuator can be manually provided, for example, in response to receiving a command via one or more user input devices operated by a pilot of the aerial vehicle. The signal can be, for example, a simple electric signal, or in some implementations, the signal can be an instruction to the landing gear actuator of the aerial vehicle to lower the landing gear.

In some implementations, if an emergency condition is detected that indicates that the landing gear actuator is unable to lower the landing gear before a predicted impact, the vehicle management system can trigger release of a gas stored in a container to lower the landing gear. The container of gas can be a one-time use device that rapidly deploys the landing gear of the aerial vehicle. Providing the signal to the gas bottle can rapidly deploy the landing gear, thereby reducing the amount of time to lower the landing gear and potentially preventing or reducing damage to the aerial vehicle upon impact. Additionally, the vehicle management system can provide a notification for presentation via an output device (e.g., a display device, an audio alarm, a haptic feedback device, etc.) of the aerial vehicle. The vehicle management system can provide one or more notifications in a graphical user interface on a display device of the aerial vehicle, which can include or otherwise indicate the signal to lower the landing gear.

Additionally, the signal may activate one or more control programs that can control the position, orientation, velocity, or other operating characteristics of the aerial vehicle. The control programs can be executed by an autonomous flight control system of the aerial vehicle, and can control or otherwise maneuver the aerial vehicle to minimize the force of ground impact. This is beneficial in circumstances where the pilot may be distracted or unable to control the aerial vehicle to minimize the effects of an impact. The control programs may posture the aerial vehicle relative to detected terrain or maneuver the aerial vehicle to avoid detected obstacles in the environment when executing a landing.

B. Computer System

Figure 4:
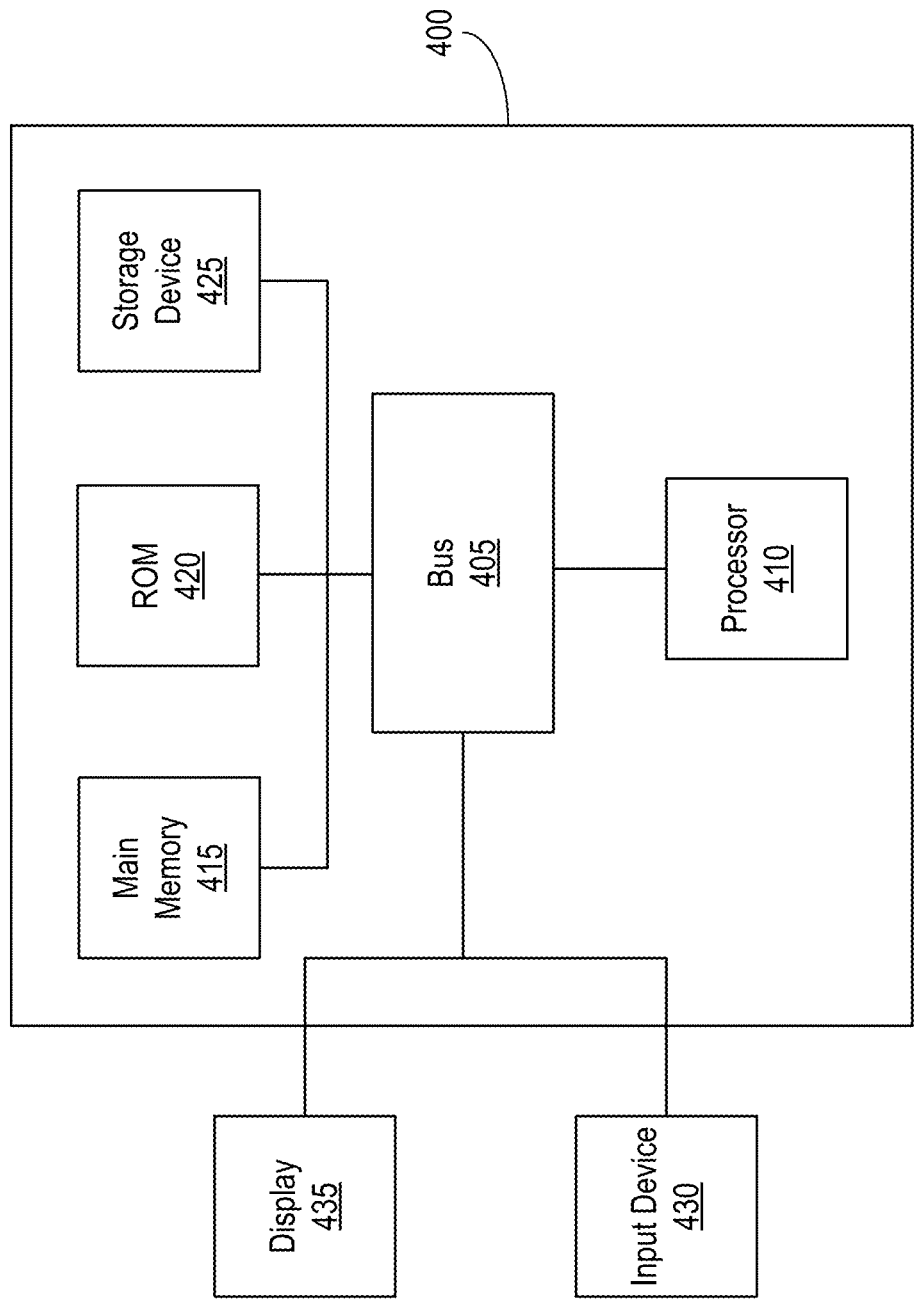
FIG. 4 illustrates a block diagram of an example computer system useful in implementing one or more components detailed herein.

Referring now to FIG. 4, depicted is a block diagram of an example computer system 400. The computer system or computing device 400 can include or be used to implement the system 100, or its components such as the vehicle management system 110. The computing system 400 includes at least one bus 405 or other communication component for communicating information and at least one processor 410 or processing circuit coupled to the bus 405 for processing information. The computing system 400 can also include one or more processors 410 or processing circuits coupled to the bus 405 for processing information. The computing system 400 also includes at least one main memory 415, such as a random access memory (RAM) or other dynamic storage device, coupled to the bus 405 for storing information, and instructions to be executed by the processor 410. The computing system 400 may further include at least one read only memory (ROM) 420 or other static storage device coupled to the bus 405 for storing static information and instructions for the processor 410. A storage device 425, such as a solid state device, magnetic disk, or optical disk, can be coupled to the bus 405 to persistently store information and instructions.

The computing system 400 may be coupled via the bus 405 to a display 435, such as a liquid crystal display, or active matrix display, for displaying information to a user such as an administrator of the data processing system. An input device 430, such as a keyboard or voice interface may be coupled to the bus 405 for communicating information and commands to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the display devices of the aerial vehicle, or other components described in connection with FIG. 1.

The processes, systems, and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors 410 in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description, or any claims are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for automatically controlling landing gear responsive to detected aerial vehicle conditions, comprising:
receiving, by one or more processors coupled to memory of an aerial vehicle, from one or more sensors of the aerial vehicle, altitude information and speed information of the aerial vehicle;
determining, by the one or more processors, to extend landing gear of the aerial vehicle based on a change in a state of the aerial vehicle;
identifying, by the one or more processors, a curve that varies as a function of altitude and speed of the aerial vehicle in a multivariate space and is established according to a type of the aerial vehicle and the state of the aerial vehicle, wherein the curve defines a first region in the multivariate space that indicates landing gear is to be lowered and a second region in the multivariate space that indicates landing gear is not to be lowered;
determining, by the one or more processors, that the speed information and the altitude information are within the first region of the multivariate space defined by the curve to determine that a condition to lower the landing gear is satisfied; and
responsive to determining that the condition to lower the landing gear is satisfied, providing, by the one or more processors, a signal to lower the landing gear.

2. The method of claim 1, comprising instructing, by the one or more processors responsive to the signal, a landing gear component of the aerial vehicle to lower the landing gear of the aerial vehicle.

3. The method of claim 1, comprising:
identifying, by the one or more processors, an amount of time required to lower the landing gear of the aerial vehicle; and
identifying, by the one or more processors, the curve based on the amount of time.

4. The method of claim 1, comprising triggering, by the one or more processors, release of a gas stored in a container to lower the landing gear of the aerial vehicle to reduce an amount of time to lower the landing gear.

5. The method of claim 1, further comprising providing, by the one or more processors responsive to the signal, a notification for presentation via an output device of the aerial vehicle that includes the signal to lower the landing gear.

6. The method of claim 1, wherein the multivariate space is defined according to a plurality of variables, each of the plurality of variables associated with a respective weight value; and
wherein determining that the speed information and the altitude information are within the first region of the multivariate space comprises comparing, by the one or more processors, each of the speed information and the altitude information based on the respective weight value associated with a respective variable of the plurality of variables.

7. The method of claim 6, further comprising adjusting, by the one or more processors, the respective weight value associated with at least one variable of the plurality of variables based on the state of the aerial vehicle.

8. The method of claim 1, wherein the change in the state is one or more of an engine failure, a rate of descent exceeding a threshold descent, damage to the aerial vehicle, or a system failure.

9. The method of claim 1, wherein detecting the change in the state of the aerial vehicle is responsive to receiving an indication of the change in the state from one or more second sensors of the aerial vehicle.

10. The method of claim 1, further comprising:
receiving, by the one or more processors, an input from an interface of the aerial vehicle that indicates a command to lower the landing gear; and
providing, by the one or more processors, the signal that indicates the landing gear should be lowered.

11. A system for automatically controlling landing gear responsive to detected aerial vehicle conditions, comprising:
one or more processors coupled to memory of an aerial vehicle, configured to:
receive, from one or more sensors of the aerial vehicle, altitude information and speed information of the aerial vehicle;
determine to extend landing gear of the aerial vehicle based on a change in a state of the aerial vehicle;
identify a curve that varies as a function of altitude and speed of the aerial vehicle in a multivariate space and is established according to a type of the aerial vehicle and the state of the aerial vehicle, wherein the curve defines a first region in the multivariate space that indicates landing gear is to be lowered and a second region in the multivariate space that indicates landing gear is not to be lowered;
determine that the speed information and the altitude information are within the first region of the multivariate space defined by the curve to determine that a condition to lower the landing gear is satisfied; and
responsive to determining that the condition to lower the landing gear is satisfied, provide a signal to lower the landing gear.

12. The system of claim 11, wherein the one or more processors are further configured to instruct, responsive to the signal, a landing gear component of the aerial vehicle to lower the landing gear of the aerial vehicle.

13. The system of claim 11, wherein the one or more processors are further configured to:
identify an amount of time required to lower the landing gear of the aerial vehicle; and
identify the curve based on the amount of time.

14. The system of claim 11, wherein the one or more processors are further configured to trigger release of a gas stored in a container to lower the landing gear of the aerial vehicle to reduce an amount of time to lower the landing gear.

15. The system of claim 11, wherein the one or more processors are further configured to provide, responsive to the signal, a notification for presentation via an output device of the aerial vehicle that includes the signal to lower the landing gear.

16. The system of claim 11, wherein the multivariate space is defined according to a plurality of variables, each of the plurality of variables associated with a respective weight value; and
wherein to determine that the speed information and the altitude information are within the first region of the multivariate space, the one or more processors are further configured to compare each of the speed information and the altitude information based on the respective weight value associated with a respective variable of the plurality of variables.

17. The system of claim 16, wherein the one or more processors are further configured to adjust the respective weight value associated with at least one variable of the plurality of variables based on the state of the aerial vehicle.

18. The system of claim 11, wherein the change in the state is one or more of an engine failure, a rate of descent exceeding a threshold, damage to the aerial vehicle, or a system failure.

19. The system of claim 11, wherein the one or more processors are further configured to detect the change in the state of the aerial vehicle responsive to receiving an indication of the change in the state from one or more second sensors of the aerial vehicle.

20. The system of claim 11, wherein the one or more processors are further configured to:
receive an input from an interface of the aerial vehicle that indicates a command to lower the landing gear; and
provide the signal that indicates the landing gear should be lowered.

* * * * *